July 6, 1926.

A. GRIEVES

CAMERA

Filed June 22, 1925

Albert Grieves INVENTOR.

BY

*(signature)* ATTORNEYS

July 6, 1926.
A. GRIEVES
CAMERA
Filed June 22, 1925
1,591,484
3 Sheets-Sheet 2
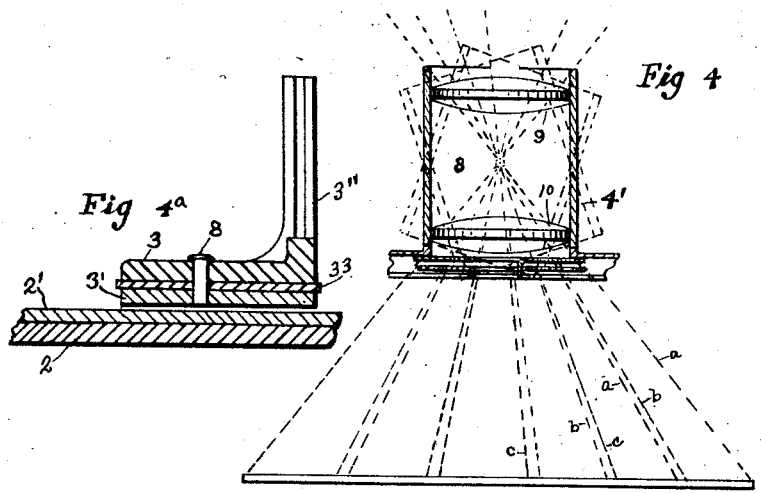
Fig 4
Fig 4a
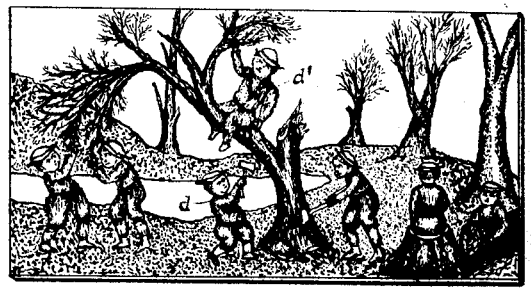
Fig 5
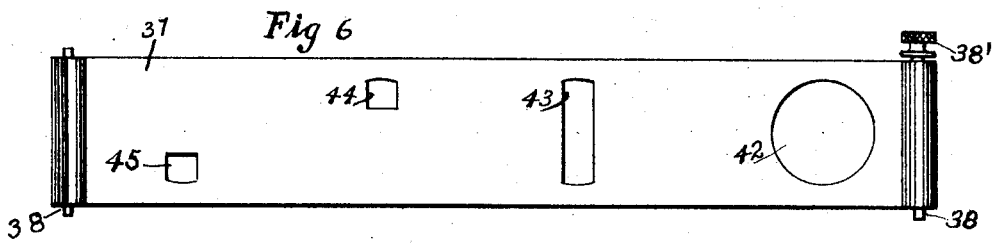
Fig 6
INVENTOR.
Albert Grieves
BY
ATTORNEYS July 6, 1926.
A. GRIEVES
CAMERA
Filed June 22, 1925   3 Sheets-Sheet 3
1,591,484
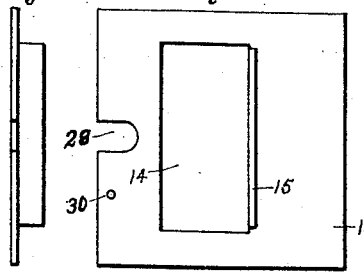
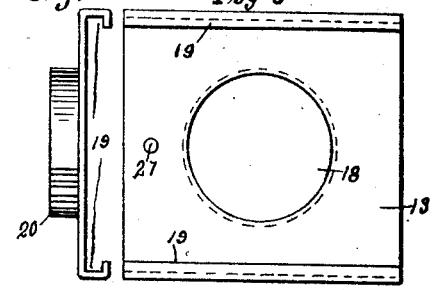
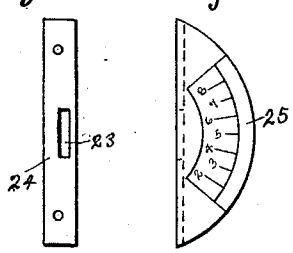
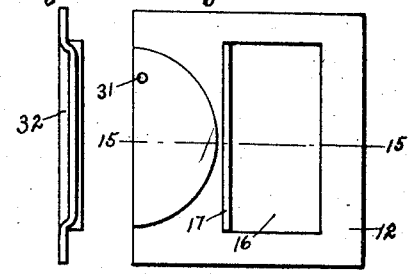
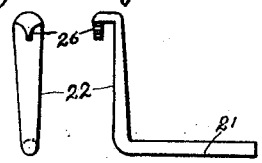
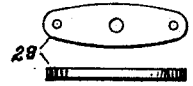
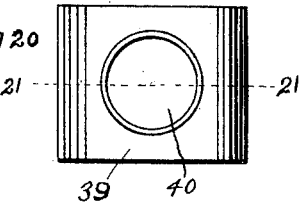
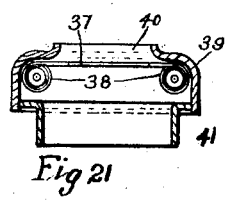
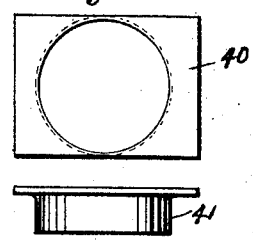
INVENTOR.
BY
ATTORNEYS Patented July 6, 1926.

1,591,484

UNITED STATES PATENT OFFICE.

ALBERT GRIEVES, OF SPRINGFIELD, OHIO.

CAMERA.

Application filed June 22, 1925. Serial No. 38,673.

My invention relates to improvements in cameras, it particularly relating to an arrangement whereby a plurality of exposures of the same object may be made upon a single sensitized plate.

The object of my invention is to provide an arrangement of the character referred to which will be simple in construction and effective in operation, and also one which may if desired be applied to any camera now in use with a slight alteration therein.

In the accompanying drawings:

Fig. 4 is a transverse section of the lens carrying sleeve and its lenses showing one of my attachments and also illustrating in dotted lines the overlapping feature of the exposures.

Figure 1:
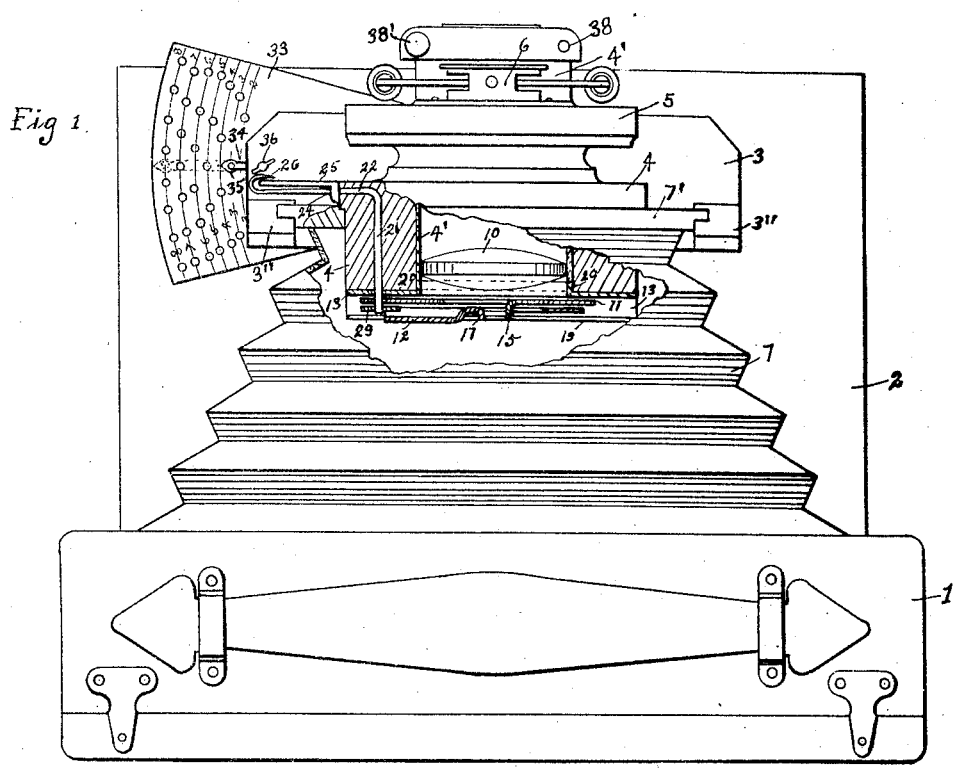
Fig. 1 is a plan view of a camera embodying the improvements partly broken away and shown in section.
Figure 2:
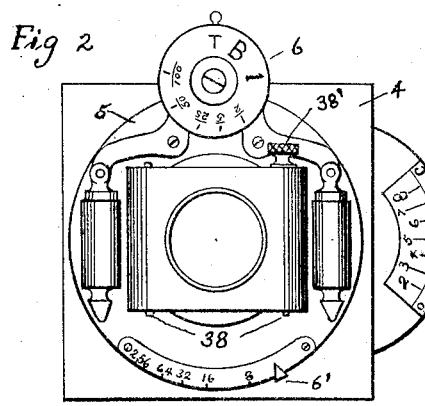
Fig. 2 is a front elevation of the lens box showing one of my attachments applied thereto.
Figure 3:
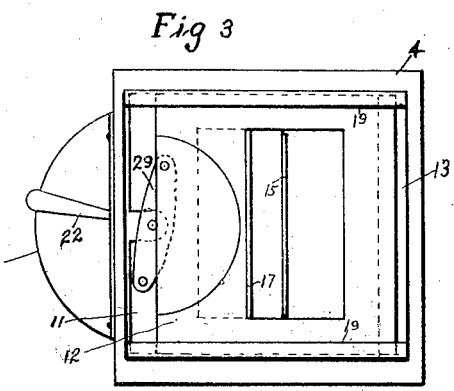
Fig. 3 is a rear view of the lens box showing the auxiliary shutter.

Fig. 4ª is a longitudinal section of the lens box support showing the manner of swivelling the same.

Fig. 5 is a representation of a photograph made from a plate upon which a series of exposures of the same object have been made.

Fig. 6 is a view of the curtain which forms a part of one of my attachments.

Fig. 7 is a rear elevation of one of the auxiliary shutters.

Fig. 8 is a side view of the same.

Fig. 9 is a rear elevation of the supporting guide plate for the auxiliary shutters.

Fig. 10 is a side elevation of the same.

Fig. 11 is a front elevation of the scale which indicates the position of the auxiliary shutters.

Fig. 12 is a side view of the same.

Fig. 13 is a rear elevation of the other of the auxiliary shutters.

Fig. 14 is a side elevation of the same.

Fig. 15 is a section on the line 15—15 of Fig. 15.

Figs. 16 and 17 are detail views of the operating lever and its shaft for the auxiliary shutters.

Figs. 18 and 19 are details of the double crank arm which is attached to the operating shaft for the auxiliary shutters.

Fig. 20 is a front elevation of one of my attachments.

Fig. 21 is a section on the line 21—21 of Fig. 20.

Fig. 22 is a rear view of the same.

Fig. 23 is a plan view of the same.

Referring to the drawings, 1 represents the main casing of the camera and 2 the usual hinged door which when open forms a base and is equipped with the usual slide 2' for the sliding support 3. In the present case, the base of this sliding support is formed of two sections 3 and 3', the section 3' being mounted to slide upon the slide 2' and the section 3 is swivelly connected with the section 3' by the pin 8 (Fig. 4ª). The section 3' has upwardly projecting standards 3" provided with vertical grooves to receive the tongues formed on the side edges of the bellow-frame 7' to which the bellows 7 is connected. The frame 7' has secured to it a box 4 on which is secured the sleeve 4' which carries the two lenses 9 and 10. The lens carrying sleeve 4' has formed thereon a circular casing 5 which carries the usual adjustable diaphragm and shutters, which I will call the main shutters (not shown) and it also carries the main shutter operating devices connected in a general way at 6, and pointer 6' having a connection (not shown) with the adjustable diaphragm.

One of my attachments consists of an auxiliary diaphragm consisting of a pair of members in the form of plates 11 and 12 (Figs. 7, 8, 13 and 14 for detail) which are slidably mounted in overlapping relation in a grooved plate 13 attached to the rear end of the lens box 4. Referring to Figs. 7, 8, 13 and 14, the plate 11 has an oblong opening 14, the outside edge of which is bent rearwardly to form a stop flange 15 and the plate 12 has an oblong opening 16 the outside of which is bent rearwardly to form a stop flange 17. The plate 13 (Figs. 9 and 10) in which the diaphragm members are mounted is provided with a circular opening 18 in size corresponding to the size of each of the lenses and also has its top and bottom edges bent to form channels 19 in which the diaphragm members slide. The forward side of the plate 13 also preferably has a circular flange 20 which projects into the circular interior of the lens box 4 and abuts the rear end of the sleeve 4'. To operate the diaphragm members there is provided a shaft 21 which is journaled in the wall of the lens box 4 (Fig. 1) and projects longitudinally with its rear end extended beyond the rear end of the lens box and its forward end provided with an integrally formed lever 22 which projects through a slotted opening 23 of the rearwardly projecting flange 24 of a dial plate 25 secured to the lens box 4, the free end of the lever being bent over the outer edge of the dial plate so as to provide a pointer 26 to cooperate with indications on the dial plate, the rear end of the shaft 21 after projecting through an opening 27 in the guide plate 13 and an open ended slot 28 in the plate 11 has secured to it a double crank arm 29 (Figs. 18 and 19 for detail) one arm of which is connected to the plate 11 as at 30, the other arm of which is connected to the plate 12 as at 31. To accommodate this crank arm 29 the plate 12 is offset as indicated at 32.

As a result of this arrangement whenever the lever 22 is moved over the dial the plates 11 and 12 will be moved in opposite directions so as to cause the openings 14 and 16 to overlap more or less and thereby increase or diminish the size of opening through these auxiliary diaphragms. In the present case eight different attachments are provided for. When the pointer 26 is placed at the indication marked 2 on the dial 25 an opening will be provided through an auxiliary diaphragm which will expose substantially one-half of the sensitized plate in the camera. If the pointer is placed at 8 the opening will be reduced so as to expose but substantially one eighth of the sensitized plate. In practice this exposure is somewhat greater than one half or one eighth so as to provide for an overlapping of exposures in the maner indicated in dotted lines in Fig. 4 in which the first exposure is indicated by the lines $a$—$a$, the second exposure by the lines $b$—$b$, the next exposure by the lines $c$—$c$, etc., in which it will be seen that $a$ and $b$ and $b$ and $c$ overlap.

Cooperating with the attachment thus described is a second dial plate 33 (Fig. 1) which is provided with seven series of openings. The first series has two openings, the next series three openings and so on up to eight openings in the last or outer series. This dial plate 33 is extended over the entire upper surface of the base section $3'$ and is secured thereto so as to remain stationary and also provides a surface upon which the base section 3 may turn. Cooperating with the dial 33 is a spring finger 34 having a pin 35 adapted to spring in any one of the openings. This finger is adjustable in and out and held in its adjusted position by a clamp in the form of a thumb nut 36, the clamp securing the finger to the base section 3. If now, two exposures are to be made upon the sensitized plate the spring finger will be adjusted so that this pin will sweep over the series of two openings in the lower circle of the dial plate. It being first set in one opening and an exposure made and then moved to the second opening and another exposure made. In making such exposures the auxiliary diaphragm plates 11 and 12 have been adjusted to their widest extent. If eight exposures are desired the spring finger is moved outwardly to the last series of eight openings, the opening through the plates 11 and 12 adjusted to its smallest extent and the spring finger moved from one opening to another as exposures are made. This spring finger being connected to the support 3 when moved turns the support together with the lens box and other apparatus carried thereby to the different positions relative to the object or objects to be photographed upon a single sensitized plate as many times as desired within the limits of 1 and 8 in the present arrangement.

The second attachment is illustrated in Figs. 1, 2, 6, 20 and 21 and consists of a curtain 37 wound upon rolls 38 which are supported in a cylindrical casing 39 having its end entirely open and its front end formed with a reduced circular opening 40 (Figs. 6, 20 and 21). This cylindrical casing 39 fits upon the upper end of the lens-carrying sleeve $4'$. The curtain is provided with a circular opening 42 to correspond with the lens opening in the sleeve $4'$, an oblong opening 43 of a length equal to the diameter of the opening 42 but much narrower than said opening and two other smaller openings 44 and 45 placed on opposite sides of the transverse center of the openings 42 and 43. One roll is preferably provided with a finger piece $38'$ to wind the curtain from one roll to another, and the other roll is a spring roll.

The circular opening 42 is used only when it is desired to expose the plate to a single view and the opening 43 is used when the adjustable diaphragm is fully opened as in dark weather and more than a single exposure is to be made upon the plate. The openings 44 and 45 are used to expose respectively upper and lower portions of the plate when more than a single exposure is being made so that the same figure or body can be exposed upon the plate one above the other as shown at $d$ and $d^1$ in Fig. 5.

The adjustable diaphragm contained in the casing 5 is adjusted in the ordinary way to conform to weather conditions and time of exposure and the main shutters also contained in the casing 5 are likewise manipulated in the usual manner either by snap or time exposures.

Having thus described my invention, I claim:

1. In a camera, the combination, with a plate holder, a laterally swingable lens box and a bellows connecting the plate holder and lens box to permit relative movement between the same, of a device located in the rear of the lens and carried by the lens box having an adjustable opening together with means for adjusting the width only of said opening, without altering the vertical center of the opening.

2. In a camera, the combination, with a plate holder, a laterally swingable lens box and a bellows connecting the same to permit relative movement between the holder and box, of a diaphragm member also in the rear of the lens and carried by said box additional to the main diaphragm of the camera, said additional diaphragm member having an opening, together with means for adjusting the width only of said opening, without altering the vertical center of the opening.

3. In a camera, the combination, of a laterally swingable lens box and a plate holder together with adjustable means for varying the distance between the same, of a device located in the rear of the lens and movable therewith having an adjustable opening together with means for adjusting the width only of said opening without altering the vertical center of the opening.

4. In a camera, the combination, with the movable lens, of an auxiliary diaphragm located in the rear of the lens, said diaphragm consisting of two apertured members arranged in overlapping relation, together with means for adjusting said members simultaneously in opposite directions to increase or diminish the width only of the opening through the diaphragm, without altering the vertical center of said opening.

5. In a camera, the combination, with the lens, of a device located in the rear of the lens having an adjustable opening together with means for adjusting the size of said opening, and means for swinging the lens from side to side in steps proportional to the size of said opening.

6. In a camera, the combination, with a pivotally supported lens, of a device located in the rear of the lens having an adjustable opening together with means for adjusting the size of said opening, the pivotal point of said lens being located at the point of convergence of the light rays, and means for swinging the lens from side to side in steps proportional to the size of said opening.

7. In a camera, the combination, with the lens, of a device located in the rear of the lens and having an adjustable opening elongated vertically in the direction of the height of the sensitized plate together with means for adjusting the width of said opening, and means for swinging the lens from side to side in steps proportional to the width of said opening.

8. In a camera, the combination, with the lens, of a diaphragm member located in the rear of the lens additional to the main diaphragm of the camera, said additional diaphragm member having an opening adjustable as to width to expose more or less of the length of the sensitized plate, and means for swinging the lens from side to side in steps proportional to the width of said opening.

9. In a camera, the combination, with the lens, of an auxiliary diaphragm located in the rear of the lens, said diaphragm consisting of two apertured members arranged in overlapping relation, together with means for adjusting said members simultaneously in opposite directions to increase or diminish the size of the opening through the diaphragm, and means for swinging the lens from side to side in steps proportional to the size of said opening.

10. In a camera, the combination, with the lens, of a diaphragm member located in the rear of the lens additional to the main diaphragm of the camera, said additional diaphragm member having an opening adjustable as to width to expose more or less of the sensitized plate, means for adjusting the width of said opening comprising a pointer and scale to determine the width of said opening, and means for swinging said lens from side to side comprising a pointer and scale to determine the extent of swinging movement imparted to said lens, the swinging movements of the lens and the size of said opening being relatively proportional.

11. In a camera, the combination, with the lens, of an auxiliary diaphragm located in the rear of the lens, said diaphragm consisting of two apertured members arranged in overlapping relation, a rock shaft, an operating lever connected with said shaft, and pivotal connections between said shaft and diaphragm members for moving said members in opposite directions to regulate the size of the opening through the same.

12. In a camera, the combination, with the lens, of an adjustable diaphragm member located in the rear of the lens additional to the main diaphragm of the camera together with means for adjusting the size of the opening through said diaphragm, in connection with a curtain device arranged to be attached on the forward side of said lens and having a pair of openings one above and one below the transverse center of the lens and located in different vertical planes.

13. In a camera, the combination, with the lens, of an adjustable diaphragm member located in the rear of the lens additional to the main diaphragm of the camera together with means for adjusting the size of the opening through said diaphragm, in connection with a curtain device arranged to be attached on the forward side of said lens and having a pair of openings one above and one below the transverse center of the lens and located in different vertical planes, and means for adjusting said curtain device to bring one or the other of said openings in front of said lens.

14. In a camera, the combination, with the lens, of an adjustable diaphragm member located in the rear of the lens additional to the main diaphragm of the camera together with means for adjusting the size of the opening through said diaphragm, in connection with a curtain device arranged to be attached on the forward side of said lens and having a pair of openings one above and one below the transverse center of the lens and located in different vertical planes, said curtain device being mounted upon rolls for the purpose of moving the same to bring one or the other of said openings in front of said lens.

15. In a camera, the combination, with the lens, of an auxiliary diaphragm located in the rear of the lens having an adjustable opening, and a curtain device located in front of the lens together with means for moving the same transversly of the lens, said curtain device having a round opening substantially of the diameter of the lens, and an elongated opening of a width narrower than the diameter of the lens, and a pair of smaller openings, one below and one above the transverse center of said lens.

In testimony whereof, I have hereunto set my hand this 18th day of June, 1925.

ALBERT GRIEVES.